(12) United States Patent
Kung et al.

(10) Patent No.: US 8,030,400 B2
(45) Date of Patent: Oct. 4, 2011

(54) THERMOPLASTIC POLYCARBONATE COMPOSITIONS WITH IMPROVED CHEMICAL AND SCRATCH RESISTANCE

(75) Inventors: Edward Kung, Bergen op Zoom (NL); Wilhelmus Johannes Daniel Steendam, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 82 days.

(21) Appl. No.: 11/461,466

(22) Filed: Aug. 1, 2006

(65) Prior Publication Data
US 2008/0033108 A1 Feb. 7, 2008

(51) Int. Cl.
*C08G 64/06* (2006.01)
*C08G 64/18* (2006.01)

(52) U.S. Cl. .......................... 525/66; 525/67

(58) Field of Classification Search ................... 525/66, 525/67
See application file for complete search history.

(56) References Cited

U.S. PATENT DOCUMENTS

| | | | |
|---|---|---|---|
| 3,511,895 A | 5/1970 | Kydonieus et al. | |
| 3,981,944 A | 9/1976 | Okamoto et al. | |
| 4,154,775 A | 5/1979 | Axelrod | |
| 4,461,868 A | 7/1984 | Lindner et al. | |
| 4,539,370 A | 9/1985 | Nouvertne et al. | |
| 4,746,701 A | 5/1988 | Kress et al. | |
| 4,866,125 A | 9/1989 | Lo et al. | |
| 4,902,735 A | 2/1990 | Okamoto et al. | |
| 4,908,422 A | 3/1990 | Leitz et al. | |
| 5,075,374 A | 12/1991 | Wallach | |
| 5,128,437 A | 7/1992 | Westeppe et al. | |
| 5,414,045 A | 5/1995 | Sue et al. | |
| 5,447,989 A | 9/1995 | Mylonakis et al. | |
| 5,510,429 A * | 4/1996 | Lee et al. | 525/468 |
| 5,565,515 A * | 10/1996 | Ishiwa et al. | 524/504 |
| 6,001,929 A | 12/1999 | Nodera et al. | |
| 6,262,173 B1 | 7/2001 | Kurata et al. | |
| 6,518,336 B1 | 2/2003 | Yabuhara et al. | |
| 6,548,623 B2 | 4/2003 | Brunelle et al. | |
| 6,583,204 B1 | 6/2003 | Eckel et al. | |
| 7,501,481 B2 * | 3/2009 | Kamps et al. | 528/196 |
| 7,655,737 B2 | 2/2010 | Chakravarti et al. | |
| 2003/0139504 A1 | 7/2003 | Miebach et al. | |
| 2003/0149223 A1 | 8/2003 | McCloskey et al. | |
| 2003/0181603 A1 * | 9/2003 | Venderbosch et al. | 525/461 |
| 2004/0034132 A1 | 2/2004 | Campbell et al. | |
| 2004/0097662 A1 * | 5/2004 | Gaggar et al. | 525/469 |
| 2005/0133697 A1 | 6/2005 | Potyrailo et al. | |
| 2005/0137310 A1 | 6/2005 | Gupta et al. | |
| 2005/0171297 A1 | 8/2005 | Koevoets et al. | |
| 2005/0171322 A1 * | 8/2005 | Kamps et al. | 528/196 |
| 2005/0228130 A1 | 10/2005 | Kalyanaraman et al. | |
| 2005/0261460 A1 * | 11/2005 | Cella et al. | 528/196 |
| 2006/0079615 A1 * | 4/2006 | DeRudder et al. | 524/128 |
| 2006/0205848 A1 * | 9/2006 | Siripurapu et al. | 524/115 |
| 2007/0082995 A1 | 4/2007 | Costanzi et al. | |
| 2008/0029744 A1 | 2/2008 | Jansen et al. | |

FOREIGN PATENT DOCUMENTS

| | | |
|---|---|---|
| EP | 0412407 A2 | 2/1991 |
| EP | 1201714 B1 | 5/2002 |
| EP | 1627897 B1 | 2/2006 |
| JP | 62-70446 | 3/1987 |
| JP | 02301765 A2 | 12/1990 |
| JP | 02301767 A2 | 12/1990 |
| JP | 05-034851 | 2/1993 |
| JP | 11302370 A2 | 11/1999 |
| JP | 2005119124 A | 5/2005 |
| WO | 2005085319 A1 | 9/2005 |
| WO | 2006036545 A1 | 4/2006 |

OTHER PUBLICATIONS

Brunelle, Kirk Othmer Encyclopedia of Chemical Technology, "Polycarbonates", pp. 1-28, Nov. 2001.*
Written Opinion of International Searching Authority for PCT/US2007/074331; International Filing Date: Jul. 25, 2007; Date of Mailing: Dec. 17, 2007; 3 pages.
International Search Report for PCT/US2007/074331; International Filing Date: Jul. 25, 2007; Date of Mailing: Dec. 17, 2007; 2 pages.

* cited by examiner

*Primary Examiner* — Jeffrey Mullis
(74) *Attorney, Agent, or Firm* — Cantor Colburn LLP

(57) ABSTRACT

Disclosed is a thermoplastic composition comprising a polycarbonate terpolymer comprising structures derived from structures (I), (II) and (III), wherein (I) is a dihydroxy compound having the structure (A):

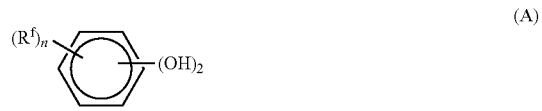

(A)

wherein n is 0 to 4 and $R^f$ is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and $R^f$ are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer and wherein said polycarbonate terpolymer is amorphous; an impact modifier; and an ungrafted rigid copolymer. The thermoplastic composition has improved chemical resistance and scratch resistance.

18 Claims, No Drawings

THERMOPLASTIC POLYCARBONATE COMPOSITIONS WITH IMPROVED CHEMICAL AND SCRATCH RESISTANCE

BACKGROUND OF THE INVENTION

This invention is directed to thermoplastic compositions comprising an aromatic polycarbonate copolymer, and in particular thermoplastic polycarbonate compositions having improved chemical and scratch resistance.

Thermoplastics having good chemical and/or scratch resistance are useful in the manufacture of articles and components for a wide range of applications, from automobile components, to decorative articles, to housings for electronic appliances, such as computers and cell phones. Dihydroxy aromatic compounds are generally known to be useful in the preparation of polycarbonates that exhibit good chemical and scratch resistance and good barrier properties. Excellent mechanical properties are also desired in a thermoplastic composition for use in these applications.

There accordingly remains a need in the art for thermoplastic polycarbonate compositions having improved chemical and scratch resistance. Desirable features of such materials also include both excellent mechanical properties and ease of manufacture. The mechanical properties of the thermoplastic composition with improved chemical and scratch resistance are desirably comparable to those of other thermoplastic polycarbonate compositions.

SUMMARY OF THE INVENTION

The above needs are met by a thermoplastic composition comprising a polycarbonate terpolymer comprising structures derived from at least three different dihydroxy groups, an impact modifier and an ungrafted rigid copolymer. The ungrafted rigid copolymer optionally comprises acrylonitrile monomer or (meth)acrylate monomer. The polycarbonate terpolymer comprises structures derived from structures (I), (II) and (III), wherein (I) is a dihydroxy compound having the structure (A):

wherein n is 0 to 4 and $R^f$ is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and $R^f$ are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, and wherein said polycarbonate terpolymer is amorphous.

In another embodiment, an article comprises the above-described thermoplastic composition.

In another embodiment, a thermoplastic composition comprises a polycarbonate terpolymer comprising structures derived from structures (I), (II) and (III), wherein (I) is a dihydroxy compound having the structure (A):

wherein n is 0 to 4 and $R^f$ is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and $R^f$ are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of dihydroxy groups (I):(II):(III) is approximately 1:1:1, and wherein the polycarbonate terpolymer is amorphous; an impact modifier; and an ungrafted rigid copolymer.

In another embodiment, a thermoplastic composition comprises a polycarbonate terpolymer comprising structures derived from structures (I), (II) and (III), wherein (I) is a dihydroxy compound having the structure (A):

wherein n is 0; (II) comprises a second dihydroxy compound derived from Formula (A) wherein n is 1 and $R^f$ is $C_1$; (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of dihydroxy groups (I):(II):(III) is approximately 1:1:1, and wherein the polycarbonate terpolymer is amorphous; an impact modifier; and an ungrafted rigid copolymer. In some embodiments, the third dihydroxy compound is bisphenol A.

One method for forming an article comprises molding, extruding, shaping or forming the composition to form the article.

The above-described and other features are exemplified by the following detailed description.

DETAILED DESCRIPTION OF THE INVENTION

In an embodiment, a thermoplastic composition comprises a polycarbonate terpolymer comprising structures derived from structures (I), (II) and (III), wherein (I) is a dihydroxy compound having the structure (A):

wherein n is 0 to 4 and $R^f$ is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and R^f are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer and wherein the polycarbonate terpolymer is amorphous; an impact modifier; and an ungrafted rigid copolymer.

In some embodiments, the thermoplastic composition comprises from about 10 to about 85 wt. % of the polycarbonate terpolymer; from about 5 to about 45 wt. % of the impact modifier; and from about 10 to about 45 wt. % of the ungrafted rigid copolymer, wherein the sum of the polycarbonate terpolymer, the impact modifier and the ungrafted rigid copolymer equals 100 wt. %. In other embodiments, the ratio of dihydroxy groups (I):(II):(III) is approximately 1:1:1. In some embodiments, the first dihydroxy (I) of Formula (A) n is 0, and optionally, the second dihydroxy (II) of Formula (A) n is 1 and R^f is $C_1$.

In some embodiments, the impact modifier is ABS, MBS, ASA, polycarbonate-polysiloxane copolymer, or a combination of two or more of the foregoing impact modifiers. In some embodiments, the ungrafted rigid copolymer foregoing comprises acrylonitrile monomer or (meth)acrylate monomer, optionally SAN or PMMA.

In some embodiments, the thermoplastic composition further comprises a flow promoter, and the flow promoter optionally comprises a low molecular weight hydrocarbon resin derived from petroleum $C_5$ to $C_9$ feedstock.

In another embodiment, a thermoplastic composition comprises a polycarbonate terpolymer comprising structures derived from structures (I), (II) and (III), wherein (I) is a dihydroxy compound having the structure (A):

wherein n is 0 to 4 and R^f is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and R^f are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of dihydroxy groups (I):(II):(III) is approximately 1:1:1, and wherein the polycarbonate terpolymer is amorphous; an impact modifier; and an ungrafted rigid copolymer.

In another embodiment, a thermoplastic composition comprises a polycarbonate terpolymer comprising structures derived from structures (I), (II) and (III), wherein (I) is a dihydroxy compound having the structure (A):

wherein n is 0; (II) comprises a second dihydroxy compound derived from Formula (A) wherein n is 1 and R^f is $C_1$; (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of dihydroxy groups (I):(II):(III) is approximately 1:1:1, and wherein the polycarbonate terpolymer is amorphous; an impact modifier; and an ungrafted rigid copolymer. In some embodiments, the third dihydroxy compound is bisphenol A.

As used herein, "amorphous" means having a glass-like structure with low degree of order and no crystallinity as determined by lack of a melting endotherm when analyzed by differential scanning calorimetry (DSC) (such as by ASTM D3418 or ISO 11357).

A thermoplastic (I), (II) and (III), wherein (I) is a dihydroxy compound having the structure (A):

wherein n is 0 to 4 and R^f is independently a halogen atom, a $C_{1-10}$ hydrocarbon group, or a $C_{1-10}$ halogen substituted hydrocarbon group; (II) comprises a second dihydroxy compound derived from Formula (A) and different from (I) and wherein n and R^f are as previously defined; and (III) a third dihydroxy compound different from (I) and (II), wherein the sum of the mol percent of structures (I) and (II) is greater than 45% relative to the sum of the molar amounts of (I), (II) and (III) in the polycarbonate terpolymer and wherein said polycarbonate terpolymer is amorphous; an impact modifier; and an ungrafted rigid copolymer is disclosed. The composition optionally comprises a flow promoter.

The thermoplastic composition comprises a polycarbonate, wherein the polycarbonate is a terpolymer comprising structures derived from at least three different dihydroxy groups (I), (II) and (III), wherein at least two dihydroxy groups ((I) and (II)) are comprised of structures of Formula (A) and are different from each other, and the third dihydroxy group (III) is different from the first two dihydroxy groups ((I) and (II)) and does not comprise a structure of Formula (A).

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present; and "direct bond", where part of a structural variable specification, refers to the direct joining of the substituents preceding and succeeding the variable taken as a "direct bond".

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The modifier "about" used in connection with a quantity is inclusive of the stated value and has the meaning dictated by the context (e.g., includes the degree of error associated with measurement of the particular quantity).

As used herein, the terms "polycarbonate" and "polycarbonate resin" mean compositions having repeating structural carbonate units of the formula (1):

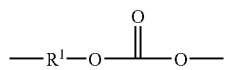

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

-$A^1$-$Y^1$-$A^2$- (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

HO-$A^1$-$Y^1$-$A^2$-OH (3)

wherein $Y^1$, $A^1$ and $A^2$ are as described above. Also included are bisphenol compounds of general formula (4):

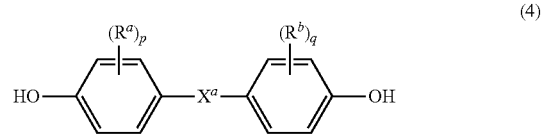

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

The polycarbonate copolymers comprise structures derived from at least three different dihydroxy groups wherein at least two dihydroxy groups ((I) and (II)) are comprised of structures of formula (A) and are different from each other:

(A)

wherein each $R^f$ is independently a halogen atom, a $C_{1-10}$ hydrocarbon group, or a $C_{1-10}$ halogen substituted hydrocarbon group, and n is 0 to 4, and the third dihydroxy group (III) is different from the first two dihydroxy groups ((I) and (II)) and does not comprise a structure of Formula (A). For example, in one embodiment the polycarbonate copolymer comprises two structures derived from formula (A): (I) wherein n is 0 (hydroquinone), and (II) wherein n is 1 and $R^f$ is $C_1$ (methylhydroquinone), and a third structure (III) that is different from (I) and (II), such as a dihydroxy group of formula 3 (such as bisphenol A). In one embodiment, the ratio of dihydroxy groups (I):(II):(III) is approximately 1:1:1 (about 33.3% of (I), about 33.3% of (II) and about 33.3% of (III)). In other embodiments, the ratio of dihydroxy groups (I):(II):(III) may be 0.05 to 0.90:0.05 to 0.90:0.05 to 0.55, optionally 0.10 to 0.80:0.10 to 0.80:0.10 to 0.55, optionally 0.15 to 0.70:0.15 to 0.70:0.15 to 0.55, optionally 0.20 to 0.60:0.20 to 0.60:0.20 to 0.55, optionally 0.25 to 0.50:0.25 to 0.50:0.25 to 0.50, wherein the sum of dihydroxy groups (I) and (II) is at least 45 mol %, optionally at least 50 mol %, optionally at least 60 mol %, and the polycarbonate terpolymer is amorphous.

The polycarbonate copolymer may comprise more than one of each of structures (I), (II) and (III). For example, the polycarbonate copolymer may comprise three structures derived from formula (A) that are all different, such as hydroquinone, methylhydroquinone, and resorcinol, and a third structure (III) that is not derived from Formula A, such as bisphenol A. Additional numbers of monomers are also possible, such as 4 different structures derived from Formula (A) that are different, 5 different structures derived from Formula A, and the like. The sum of the dihydroxy groups of all structures (I) and (II) derived from Formula A is at least 50 mol %.

Other non-limiting examples of monomer combinations for the polycarbonate copolymers include: hydroquinone (HQ)/methyl hydroquinone (MeHQ or other substituted hydroquinones)/biphenol; HQ/MeHQ/dimethyl bisphenol cyclohexane (DMBPC); HQ/MeHQ/2-phenyl-3,3-bis-(4-hydroxyphenyl) phthalimidine (PPPBP); HQ/MeHQ/1,1-bis(4-hydroxyphenyl)-3,3,5-trimethylcyclohexane (BPI); HQ/resorcinol/2,2-bis(4-hydroxyphenyl) propane (bisphenol A or BPA); HQ/chlorohydroquinone/BPA; HQ/trimethyl hydroquinone/BPA; HQ/t-butyl hydroquinone/BPA, as well as other combinations of these monomers or other substituted hydroquinones or resorcinol compounds. The polycarbonate copolymers may be made by methods known in the art, such as by the method described in U.S. Application Publication 2003/0149223.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt. % to about 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

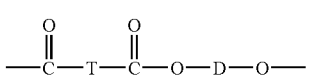

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

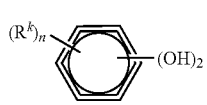
(7)

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Blends and/or mixtures of more than one polycarbonate may also be used. For example, a high flow and a low flow polycarbonate may be blended together.

The thermoplastic composition further includes one or more impact modifier compositions to increase the impact resistance of the thermoplastic composition. These impact modifiers may include an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. As used herein, the terminology "(meth)acrylate monomers" refers collectively to acrylate monomers and methacrylate monomers.

Suitable conjugated diene monomers for preparing the elastomer phase are of formula (8):

(8)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9):

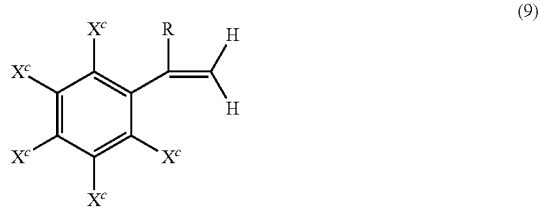

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10):

(10)

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (8), (9), or (10). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 wt. % to about 95 wt. % of the total graft copolymer, more specifically about 20 wt. % to about 90 wt. %, and even more specifically about 40 wt. % to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (10). In one embodiment, R is hydrogen or $C_1$-$C_2$ alkyl, and $X^d$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 wt. % to about 95 wt. % elastomer-modified graft copolymer and about 5 wt. % to about 65 wt. % graft (co)polymer, based on the total weight of the impact modifier. In another embodiment, such impact modifiers comprise about 50 wt. % to about 85 wt. %, more specifically about 75 wt. % to about 85 wt. % rubber-modified graft copolymer, together with about 15 wt. % to about 50 wt. %, more specifically about 15 wt. % to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines, or any other material, such as an acid, that contains a degradation catalyst. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl $C_{1-22}$ alkyl or $C_{7-25}$ alkylaryl phosphates, substituted silicates, and mixtures thereof A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt. %, optionally greater than or equal to about 60 wt. % by weight of the graft polymer. The rubber is preferably present in an amount less than or equal to about 95 wt. %, optionally less than or equal to about 90 wt. % of the graft polymer.

The rubber forms the backbone of the graft polymer, and is preferably a polymer of a conjugated diene having the formula (11):

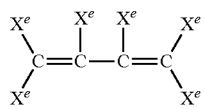

(11)

wherein $X^e$ is hydrogen, $C_1$-$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like. Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One preferred type of grafting monomer is a monovinylaromatic hydrocarbon having the formula (12):

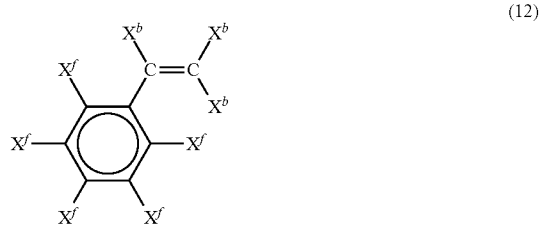

(12)

wherein $X^b$ is as defined above and $X^f$ is hydrogen, $C_1$-$C_{10}$ alkyl, $C_1$-$C_{10}$ cycloalkyl, $C_1$-$C_{10}$ alkoxy, $C_6$-$C_{18}$ alkyl, $C_6$-$C_{18}$ aralkyl, $C_6$-$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like.

A second type of grafting monomer that may be polymerized in the presence of the polymer backbone are acrylic monomers of formula (13):

(13)

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like.

A mixture of grafting monomers may also be used, to provide a graft copolymer. An example of a suitable mixture comprises a monovinylaromatic hydrocarbon and an acrylic monomer. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from General Electric Company as BLENDEX® grades 131, 336, 338, 360, and 415.

The composition may optionally comprise a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (14) (sometimes referred to herein as 'siloxane'):

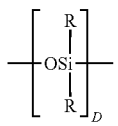
(14)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (14) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (15):

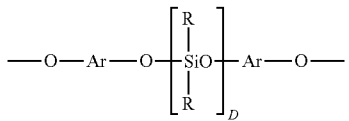
(15)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (15) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula (16):

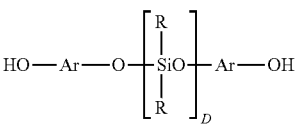
(16)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (17):

(17)

wherein R and D are as defined above. $R^2$ in formula (17) is a divalent $C_2$-$C_8$ aliphatic group. Each M in formula (19) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (18):

(18)

wherein R, D, M, $R^2$, and n are as described above.

Such dihydroxy polysiloxanes can be made by effecting a platinum catalyzed addition between a siloxane hydride of the formula (19),

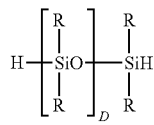

(19)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (18) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The composition further comprises an ungrafted rigid copolymer. In one embodiment, the ungrafted rigid copolymer comprises acrylonitrile monomer. The rigid copolymer is additional to any rigid copolymer present in the impact modifier. It may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (10) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt. %, specifically about 20 to about 95 wt. %, more specifically about 40 to about 90 wt. % of vinylaromatic monomer, together with 1 to about 99 wt. %, specifically about 5 to about 80 wt. %, more specifically about 10 to about 60 wt. % of copolymerizable monovinylic monomers. In one embodiment the rigid copolymer is SAN, which may comprise about 50 to about 99 wt. % styrene, with the balance acrylonitrile, specifically about 60 to about 90 wt. % styrene, and more specifically about 65 to about 85 wt. % styrene, with the remainder acrylonitrile.

In another embodiment, the ungrafted rigid copolymer comprises a (meth)acrylate monomer. The rigid copolymers include, for example, a poly(alkyl (meth)acrylate), wherein the alkyl group is straight or branched-chain, and has 1 or 2 carbons atoms. In one embodiment the rigid copolymer is a poly(alkyl (meth)acrylate), specifically a poly(methyl methacrylate) (PMMA). PMMA may be produced by the polymerization of methyl methacrylate monomer, and may be derived by (1) the reaction of acetone cyanohydrin, methanol, and sulphuric acid or (2) the oxidation of tert-butyl alcohol to methacrolein and then to methacrylic acid followed by the esterification reaction with methanol. As is known, PMMA homopolymer is difficult to obtain, and therefore is available commercially and used herein as a mixture of the homopolymer and various copolymers of methyl methacrylate and $C_1$-$C_4$ alkyl acrylates, such as ethyl acrylate. "PMMA" as used herein therefore includes such mixtures, which are commercially available from, for example, Atofina under the trade designations V825, V826, V920, V045, and VM, and from Lucite under the trade names CLG340, CLG356, CLG960, CLG902, CMG302.

Blends comprising more than one ungrafted rigid copolymer may also be used, if desired.

The rigid copolymer may be manufactured by bulk, suspension, or emulsion polymerization. In one embodiment, the rigid copolymer is manufactured by bulk polymerization using a boiling reactor. The rigid copolymer may have a weight average molecular weight of about 50,000 to about 300,000 as measured by GPC using polystyrene standards. In one embodiment, the weight average molecular weight of the rigid copolymer is about 50,000 to about 200,000.

The thermoplastic composition optionally comprises a flow promoter to improve flow and other properties, such as a low molecular weight hydrocarbon resin. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of commercially suitable low molecular weight hydrocarbon resins derived from petroleum $C_5$ to $C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark Arkon® and sold, depending on softening point, as Arkon® P140, P125, P115, P100, P90, P70 or the partially hydrogenated hydrocarbon resins sold as Arkon® M135, M115, M100 and M90, the fully or partially hydrogenated hydrocarbon resin available from Eastman Chemical under the tradename Regalite® and sold, depending on softening point, as Regalite® R1100, S1100, R1125, R1090 and R1010, or the partially hydrogenated resins sold as Regalite® R7100, R9100, S5100 and S7125, the hydrocarbon resins available from Exxon Chemical under the trade Escorez®, sold as the Escorez® 1000, 2000 and 5000 series, based on $C_5$, $C_9$ feedstock and mixes thereof, or the hydrocarbon resins sold as the Escorez® 5300, 5400 and 5600 series based on cyclic and $C_9$ monomers, optionally hydrogenated and the pure aromatic monomer hydrocarbon resins such as for instance the styrene, α-methyl styrene based hydrocarbon resins available from Eastman Chemical under the tradename Kristalex®. Low molecular weight hydrocarbon resins are generally used in amounts of about 0.1 to about 10 parts by weight, based on 100 parts by weight of the polycarbonate terpolymer, the impact modifier and the ungrafted rigid copolymer.

The relative amount of each component of the thermoplastic composition will depend on the particular type of polycarbonate(s) used, the presence of any other resins, and the particular impact modifier(s), and the rigid graft copolymer, as well as the desired properties of the composition. Particular amounts may be readily selected by one of ordinary skill in the art using the guidance provided herein.

In one embodiment, the thermoplastic composition comprises about 10 to about 75 wt. % polycarbonate terpolymer component, about 5 to about 45 wt. % impact modifier, and about 10 to about 45 ungrafted rigid copolymer, wherein the sum of the polycarbonate terpolymer, the impact modifier composition and the ungrafted rigid copolymer equals 100 wt. %. In another embodiment, the thermoplastic composition comprises about 40 to about 70 wt. % polycarbonate terpolymer, about 10 to about 30 wt. % impact modifier, and about 20 to about 40 wt. % ungrafted rigid copolymer, wherein the sum of the polycarbonate terpolymer, the impact modifier composition and the ungrafted rigid copolymer equals 100 wt. %. The thermoplastic composition optionally comprises a flow promoter in an amount of from about 0.1 to about 20 wt. %, based on 100 wt. % of the terpolymer, the impact modifier and the ungrafted rigid copolymer.

In addition to the polycarbonate terpolymer comprising structures derived from at least three different dihydroxy groups, the impact modifier and the ungrafted rigid copolymer, the thermoplastic composition may include various additives such as fillers, reinforcing agents, stabilizers, and the like, with the proviso that the additives do not adversely affect the desired properties of the thermoplastic compositions.

Examples of suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, optionally about 1 to about 20 parts by weight, and in some embodiments, about 4 to about 15 parts by weight, based on 100 parts by weight of the polycarbonate terpolymer, the impact modifier and the ungrafted rigid copolymer.

In addition, the thermoplastic composition may include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

The compositions described herein may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the polycarbonate terpolymer, the impact modifier and the ungrafted rigid copolymer.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the polycarbonate terpolymer, the impact modifier and the ungrafted rigid copolymer.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the polycarbonate terpolymer, the impact modifier and the ungrafted rigid copolymer.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4- phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the polycarbonate terpolymer, the impact modifier and the ungrafted rigid copolymer.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the polycarbonate terpolymer, the impact modifier and the ungrafted rigid copolymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the polycarbonate terpolymer, the impact modifier and the ungrafted rigid copolymer.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the polycarbonate terpolymer, the impact modifier and the ungrafted rigid copolymer.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3,"",5,""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on 100 parts by weight of the polycarbonate terpolymer, the impact modifier and the ungrafted rigid copolymer.

Suitable flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

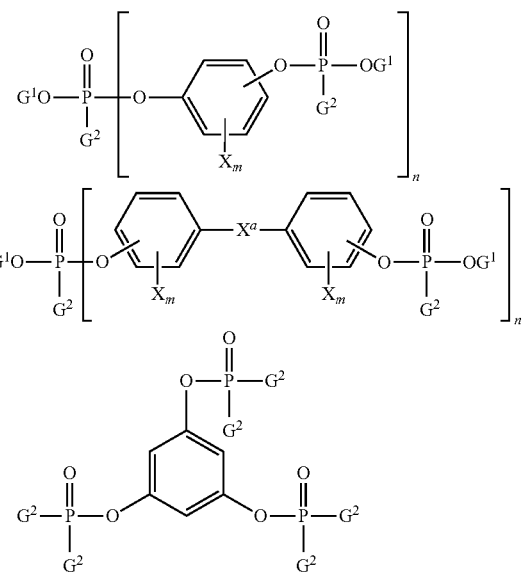

wherein each $G^1$ is independently a hydrocarbon having 1 to about 30 carbon atoms; each $G^2$ is independently a hydrocarbon or hydrocarbonoxy having 1 to about 30 carbon atoms;

each $X^a$ is as defined above; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide.

Halogenated materials may also be used as flame retardants, for example halogenated compounds and resins of formula (21):

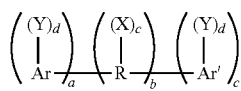

(21)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (21) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and optionally two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis(benzenesulfonylhydrazide), sodium bicarbonate, ammonium carbonate, or the like; or combinations comprising at least one of the foregoing blowing agents.

The thermoplastic compositions may be manufactured by methods generally available in the art, for example, in one embodiment, in one manner of proceeding, the polycarbonate terpolymer, impact modifier, and aromatic vinyl copolymer and any other optional components (such as antioxidants, mold release agents, and the like) are first blended, in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a side-stuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications.

The compositions are further illustrated by the following non-limiting examples, which were prepared from the components set forth in Table 1.

TABLE 1

| Material | Description | Source |
|---|---|---|
| PC-1 | BPA polycarbonate resin made by a melt process with MW 22 kg/mol measured on a PC standard basis | GE Plastics |
| PC-2 | BPA polycarbonate resin made by a melt process with MW 30 kg/mol measured on a PC standard basis | GE Plastics |
| PC-3 | BPA polycarbonate resin made by an interfacial process with MW 35 kg/mol measured on a PC standard basis | GE Plastics |
| Co-PC-1 | MeHQ/HQ/BPA copolycarbonate resin (33/34/33 mol %) made by a melt process with MW 24 kg/mol measured on a PC standard basis | GE Plastics |
| Co-PC-2 | MeHQ/HQ/BPA copolycarbonate resin (33/34/33 mol %) made by a melt process with MW 30 kg/mol measured on a PC standard basis | GE Plastics |
| ABS | High rubber graft emulsion polymerized ABS comprising about 11.1 wt. % acrylonitrile and about 38.5 wt. % styrene grafted to about 51 wt. % polybutadiene with a crosslink density of 43-55% | GE Plastics |
| PMMA | Methyl methacrylate (MMA)-ethyl acrylate (EA) copolymer, comprising about 95.6 mol % MMA and about 4.4 mol % EA | Lucite/Atofina |
| SAN-1 | Styrene acrylonitrile comprising about 25 wt. % acrylonitrile and 75 wt. % styrene | GE Plastics |
| SAN-2 | Styrene acrylonitrile comprising about 27 wt. % acrylonitrile and 73 wt. % styrene | GE Plastics |

TABLE 1-continued

| Material | Description | Source |
|---|---|---|
| PC-Si | Polysiloxane-polycarbonate copolymer comprising units derived from BPA and polysiloxane having an absolute weight average molecular weight of about 30000 g/mol, and a dimethylsiloxane content of about 20 wt. % | GE Plastics |
| FP | Flow promoter (Low molecular weight hydrocarbon resin made from $C_5$—$C_9$ petroleum feedstock) (Arkon ® P125) | Arakawa Chemical Inc. |
| PETS | Pentaerythritol tetrastearate | Faci |
| AO-1 | Primary antioxidant (Irganox ™ 1076) | Ciba |
| AO-2 | Secondary antioxidant (Irgafos ™ 168) | Ciba |
| Pigment | Pigment Black 7 | Cabot/Degussa |

Each of the sample compositions was prepared according to formulations in Table 2. All amounts are in weight percent unless otherwise noted. Samples C1 to C4 are control samples using conventional BPA polycarbonate resin, ABS and SAN; and samples C5 to C8 are control samples using conventional BPA polycarbonate resin, ABS and PMMA instead of SAN. Samples Ex. 1 to Ex. 8 are examples of the invention with different amounts of the polycarbonate terpolymer, impact modifier and ungrafted rigid copolymer. In each of the examples, samples were prepared by melt extrusion on a Werner & Pfleiderer™ 25 mm co-rotating twin screw extruder at a nominal barrel temperature of about 260° C., about 1 bar of vacuum, and about 450 rpm. The extrudate was pelletized and dried at about 100° C. for at least 4 hours. To make test specimens, the dried pellets were injection molded on an Engel ES500/110 HLV 110-ton injection molding machine at a nominal barrel temperature of 260° C.

The compositions of Table 2 were tested for Chemical Resistance and Scratch Resistance. The details of these tests used in the examples are known to those of ordinary skill in the art, and may be summarized as follows:

Chemical Resistance is a measure of the percent retention of Tensile Elongation. Chemical Resistance was evaluated per ISO 4599 using injection molded tensile bars (4 mm thick molded tensile bars tested per ISO 527) made from the example compositions. The tensile bars are clamped to a semicircular jig to impart a constant applied strain of 0.5%. The strained bars are then exposed to a specific chemical for a specific amount of time, depending on the chemical and desired test. After the exposure, the tensile bars are tested under tensile loading according to ISO 527 (Tensile Elongation at Break was determined using 4 mm thick molded tensile bars tested per ISO 527 at a pull rate of 1 mm/min. until 1% strain, followed by a rate of 50 mm/min. until the sample broke). The Tensile Elongation to Break of the exposed bars are compared to the Tensile Elongation to break of the unexposed bars. The retention of elongation is thus determined; higher retentions of elongation (as close to 100%) indicate better chemical resistance.

The specific chemicals used in the Chemical Resistance test were: Fuel C: 50/50 mixture (by volume) of toluene and isooctane (standard reagent grade having 99+% purity); Ethyl acetate (standard reagent grade 99+% purity); and Insect repellent: SC Johnson OFF!™ Hyytelö Hyönteissouja (Gel Insect Repellent) from Finland (active ingredients are 200 g/kg N,N-diethyl-m-toluamide and 435 g/kg ethanol).

Scratch Resistance was evaluated per ISO 1518 by dragging a stylus pin on the surface of injection molded plaques made from the example compositions at a constant load of 6N. The depth of the scratch produced is measured and reported as the depth in microns. Shallower scratches (lower scratch depths) indicate better scratch resistance.

Melt viscosity (MV) is a measure of a polymer at a given temperature at which the molecular chains can move relative to each other. Melt viscosity is dependent on the molecular weight, in that the higher the molecular weight, the greater the entanglements and the greater the melt viscosity, and can therefore be used to determine the extent of degradation of the thermoplastic. Degraded materials would generally show increased viscosity, and could exhibit reduced physical properties, while lower viscosities show better flow. Melt viscosity is determined against different shear rates, and may be conveniently determined by ISO11443. The melt viscosity was measured at 280° C. at a shear rate of 10,000 $s^{-1}$.

TABLE 2

| | C1 | C2 | C3 | C4 | Ex. 1 | Ex. 2 | Ex. 3 | Ex. 4 | C5 | C6 | C7 | C8 | Ex. 5 | Ex. 6 | Ex. 7 | Ex. 8 |
|---|---|---|---|---|---|---|---|---|---|---|---|---|---|---|---|---|
| Component | | | | | | | | | | | | | | | | |
| Co-PC-1 | 0 | 0 | 0 | 0 | 53.54 | 66.50 | 0 | 0 | 0 | 0 | 0 | 0 | 49.70 | 62.95 | 0 | 0 |
| Co-PC-2 | 0 | 0 | 0 | 0 | 0 | 0 | 53.54 | 66.50 | 0 | 0 | 0 | 0 | 0 | 0 | 49.7 | 62.95 |
| PC-1 | 40 | 49.44 | 0 | 0 | 0 | 0 | 0 | 0 | 36.73 | 46.53 | 0 | 0 | 0 | 0 | 0 | 0 |
| PC-2 | 13.54 | 17.06 | 53.54 | 66.5 | 0 | 0 | 0 | 0 | 12.97 | 16.42 | 49.7 | 62.95 | 0 | 0 | 0 | 0 |
| ABS | 18 | 13 | 18 | 13 | 18 | 13 | 18 | 13 | 14 | 12 | 14 | 12 | 14 | 12 | 14 | 12 |
| SAN-1 | 28 | 20 | 28 | 20 | 28 | 20 | 28 | 20 | 0 | 0 | 0 | 0 | 0 | 0 | 0 | 0 |
| PMMA | 0 | 0 | 0 | 0 | 0 | 0 | 0 | 0 | 28 | 17 | 28 | 17 | 28 | 17 | 28 | 17 |
| PC-Si | 0 | 0 | 0 | 0 | 0 | 0 | 0 | 0 | 7.5 | 7.5 | 7.5 | 7.5 | 7.5 | 7.5 | 7.5 | 7.5 |
| PETS | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| AO-1 | 0.08 | 0.1 | 0.08 | 0.1 | 0.08 | 0.1 | 0.08 | 0.1 | 0.4 | 0.15 | 0.4 | 0.15 | 0.4 | 0.15 | 0.4 | 0.15 |
| AO-2 | 0.08 | 0.1 | 0.08 | 0.1 | 0.08 | 0.1 | 0.08 | 0.1 | 0.1 | 0.1 | 0.1 | 0.1 | 0.1 | 0.1 | 0.1 | 0.1 |
| Chemical Resistance | | | | | | | | | | | | | | | | |
| Ethyl Acetate 2 min | 8 | 6 | 10 | 7 | 55 | 52 | 97 | 107 | 9 | 7 | 11 | 14 | 28 | 90 | 49 | 109 |

TABLE 2-continued

|  | C1 | C2 | C3 | C4 | Ex. 1 | Ex. 2 | Ex. 3 | Ex. 4 | C5 | C6 | C7 | C8 | Ex. 5 | Ex. 6 | Ex. 7 | Ex. 8 |
|---|---|---|---|---|---|---|---|---|---|---|---|---|---|---|---|---|
| Insect Repellent Gel 24 hr | 9 | 5 | 20 | 60 | 99 | 64 | 88 | 89 | 6 | 6 | 7 | 8 | 10 | 14 | 46 | 71 |
| Fuel C 2 min Scratch Resistance | 0 | 0 | 1 | 1 | 9 | 9 | 18 | 48 | 0 | 0 | 0 | 5 | 16 | 35 | 32 | 95 |
| 6N Scratch Pressure Melt Viscosity | 26 | 25 | 26 | 28 | 24 | 21 | 23 | 21 | 23 | 26 | 20 | 24 | 19 | 21 | 18 | 18 |
| 280° C., 10000 $s^{-1}$ shear rate (Pa-s) | 33 | 38 | 38 | 44 | 34 | 38 | 38 | 47 | 46 | 57 | 53 | 70 | 43 | 56 | 49 | 67 |

The results of Table 2 show that the samples comprising a polycarbonate terpolymer, an impact modifier, and a rigid copolymer (Ex. 1 to Ex. 8) have the best chemical and scratch resistance combination. The samples where the rigid copolymer comprises acrylonitrile monomer (Ex. 1 to Ex. 4) or where the polycarbonate terpolymer comprises more than 50 wt. % of the composition and the rigid copolymer comprises (meth)acrylate (Ex. 6 and Ex. 8) have the best chemical resistance. The samples having a standard BPA polycarbonate (C1 to C8) instead of the polycarbonate terpolymer generally had very poor chemical resistance. The samples where the rigid copolymer comprises (meth)acrylate (Ex. 5 to Ex. 8) or where the polycarbonate terpolymer comprises more than 50 wt. % of the composition and the rigid copolymer comprises acrylonitrile monomer (Ex. 2 and Ex. 4) had the best scratch resistance.

Additionally, comparing samples C1 to Ex. 1, C2 to Ex. 2, C3 to Ex. 3, C4 to Ex. 4, C5 to Ex. 5, C6 to Ex. 6, C7 to Ex. 7 and C8 to Ex. 8 shows that by replacing the standard BPA polycarbonate with the polycarbonate terpolymer and keeping the remainder of the composition the same, the chemical resistance increases significantly in all cases, and the scratch resistance improves in all cases.

Additional samples were produced using the materials in Table 1 in the amounts shown below in Table 3. All amounts are parts by weight. Samples C9 and C10 were produced using commercially available PC/ABS blends, and samples C11 to C15 were produced by molding 100% of the specified resin (neat, unblended resin). The compositions were molded and tested for chemical and scratch resistance, as detailed above, and the results are shown in Table 3 below.

TABLE 3

|  | C9 | C10 | C11 | C12 | C13 | C14 | C15 |
|---|---|---|---|---|---|---|---|
| Component |  |  |  |  |  |  |  |
| Co-PC-1 | 0 | 0 | 0 | 100 | 0 | 0 | 0 |
| Co-PC-2 | 0 | 0 | 0 | 0 | 100 | 0 | 0 |
| PC-1 | 0 | 0 | 0 | 0 | 0 | 0 | 0 |
| PC-2 | 0 | 0 | 100 | 0 | 0 | 0 | 0 |
| SAN-1 | 0 | 0 | 0 | 0 | 0 | 100 | 0 |
| PMMA | 0 | 0 | 0 | 0 | 0 | 0 | 100 |
| Sample 1* | 100 | 0 | 0 | 0 | 0 | 0 | 0 |
| Sample 2* | 0 | 100 | 0 | 0 | 0 | 0 | 0 |
| Chemical Resistance |  |  |  |  |  |  |  |
| Ethyl Acetate (2 min) | 14 | 9 | 8 | 104 | 129 | 0 | 0 |
| Insect Repellent Gel (24 hr) | 14 | 6 | 8 | 4 | 55 | 0 | 0 |
| Fuel C (2 min) Scratch Resistance | 2 | 0 | 1 | 52 | 75 | 0 | 0 |
| 6N Scratch Pressure Melt Viscosity | 27 | 23 | 27 | 18 | 18 | 24 | 23 |
| 280° C., 10000 $s^{-1}$ shear rate (Pa-s) | 37 | 45 | NT | 87 | NT | NT | NT |

*Sample C9 is commercially available Cycoloy ™ C1000HF PC/ABS resin, and Sample C10 is commercially available Cycoloy ™ CX1440 PC/ABS resin;
NT—Not Tested.

The results in Table 3 show that the polycarbonate terpolymers have excellent chemical and scratch resistance, compared to the other neat, unblended and commercially available materials.

Additional samples were produced using the materials in Table 1 in the amounts shown below in Table 4. All amounts are parts by weight. Sample Ex. 9 is the same composition as Ex. 8, and Ex. 10 to Ex. 13 are the same compositions as Ex. 9, with varying amounts of a flow promoter added. Samples Ex. 14 and Ex. 15 have a blend of a polycarbonate and a terpolymer, and sample Ex. 15 also has the flow promoter added. The compositions were molded and tested for chemical resistance and melt viscosity, as detailed above, and the results are shown in Table 4 below.

TABLE 4

| | Ex. 9 | Ex. 10 | Ex. 11 | Ex. 12 | Ex. 13 | Ex. 14 | Ex. 15 |
|---|---|---|---|---|---|---|---|
| Component | | | | | | | |
| PC-3 | 0 | 0 | 0 | 0 | 0 | 20 | 20 |
| Co-PC-2 | 62.95 | 62.95 | 62.95 | 62.95 | 62.95 | 54.45 | 54.56 |
| PC-Si | 7.5 | 7.5 | 7.5 | 7.5 | 7.5 | 0 | 0 |
| ABS | 12 | 12 | 12 | 12 | 12 | 12 | 12 |
| SAN-2 | 0 | 0 | 0 | 0 | 0 | 13 | 13 |
| PMMA | 17 | 17 | 17 | 17 | 17 | 0 | 0 |
| PETS | 0.3 | 0.3 | 0.3 | 0.3 | 0.3 | 0.3 | 0.3 |
| AO-2 | 0.1 | 0.1 | 0.1 | 0.1 | 0.10 | 0.1 | 0.1 |
| AO-1 | 0.15 | 0.15 | 0.15 | 0.15 | 0.15 | 0.15 | 0.15 |
| FP | 0 | 2 | 4 | 6 | 8 | 0 | 5 |
| Pigment | 0.25 | 0.25 | 0.25 | 0.25 | 0.25 | 0.25 | 0.25 |
| Chemical Resistance | | | | | | | |
| Ethyl Acetate (2 min) | 130 | 120 | 103 | 90 | 117 | 120 | 126 |
| Fuel C (2 min) | 103 | 100 | 94 | 91 | 90 | 79 | 108 |
| Melt Viscosity | | | | | | | |
| 280° C., 10000 s$^{-1}$ shear rate (Pa-s) | 67 | 65 | 62 | 59 | 54 | 70 | 63 |

The results in Table 4 show that the blends of polycarbonate terpolymer, impact modifier and rigid copolymer have good chemical resistance, and the addition of the flow promoter improves the flow while maintaining or improving the chemical resistance of the composition.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition comprising:
from about 10 to about 85 wt. % of a polycarbonate terpolymer comprising structures derived from at least one of each of structures (I), (II) and (III), wherein (I) is a dihydroxy compound having the structure (A):

$$(R^f)_n\text{—}\underset{}{\bigcirc}\text{—}(OH)_2 \quad (A)$$

wherein n is 0 to 4 and $R^f$ is independently a halogen atom, a $C_{1-10}$ hydrocarbon group, or a $C_{1-10}$ halogen substituted hydrocarbon group;
(II) comprises a second dihydroxy compound derived from Formula (A) and different from (I) and wherein n and $R^f$ are as previously defined; and
(III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer and wherein the polycarbonate terpolymer is amorphous;
from about 5 to about 45 wt. % of an impact modifier; and
from about 10 to about 45 wt. % of an ungrafted rigid copolymer, wherein the sum of the polycarbonate terpolymer, the impact modifier and the ungrafted rigid copolymer equals 100 wt. %,
and wherein the composition has a scratch resistance that is better than the same composition using a standard BPA polycarbonate in lieu of the polycarbonate terpolymer when measured according to ISO 1518 at a constant load of 6 N and a chemical resistance that is better than the same composition using a standard BPA polycarbonate in lieu of the polycarbonate terpolymer when measured as the percent retention of Tensile Elongation evaluated according to ISO 4599 using injection 4 mm thick molded tensile bars and wherein the chemical resistance is among one or more of an insect repellant having active ingredients of 200 g/kg N,N-diethyl-m-toluamide and 435 g/kg ethanol, ethyl acetate or a 50/50 mixture by volume of toluene and isooctane.

2. The thermoplastic composition of claim 1, wherein the impact modifier is ABS, MBS, ASA, polycarbonate-polysiloxane copolymer, or a combination of two or more of the foregoing impact modifiers.

3. The thermoplastic composition of claim 1, wherein the ungrafted rigid copolymer is derived from acrylonitrile monomer or (meth)acrylate monomer.

4. The thermoplastic composition of claim 3, wherein the ungrafted rigid copolymer is SAN or PMMA.

5. The thermoplastic composition of claim 1, further comprising a flow promoter.

6. The thermoplastic composition of claim 5, wherein the flow promoter comprises a low molecular weight hydrocarbon resin derived from petroleum $C_5$ to $C_9$ feedstock.

7. The thermoplastic composition of claim 1, wherein in the first dihydroxy (I) of Formula (A) n is 0.

8. The thermoplastic composition of claim 7, wherein in the second dihydroxy (II) of Formula (A) n is 1 and $R^f$ is $C_1$.

9. An article formed from the thermoplastic composition of claim 1.

10. A thermoplastic composition comprising
from about 10 to about 85 wt. % of a polycarbonate terpolymer comprising structures derived from structures (I), (II) and (III), wherein (I) is a dihydroxy compound having the structure (A):

(A)

wherein n is 0 to 4 and $R^f$ is independently a halogen atom, a $C_{1-10}$ hydrocarbon group, or a $C_{1-10}$ halogen substituted hydrocarbon group;

(II) comprises a second dihydroxy compound derived from Formula (A) and different from (I) and wherein n and $R^f$ are as previously defined; and (III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of dihydroxy compounds (I):(II):(III) is about 1:1:1, and wherein the polycarbonate terpolymer is amorphous;

from about 5 to about 45 wt. % of an impact modifier; and
from about 10 to about 45 wt. % of an ungrafted rigid copolymer, wherein the sum of the polycarbonate terpolymer, the impact modifier and the ungrafted rigid copolymer equals 100 wt. %, and wherein the composition has a scratch resistance that is better than the same composition using a standard BPA polycarbonate in lieu of the polycarbonate terpolymer when measured according to ISO 1518 at a constant load of 6 N and a chemical resistance that is better than the same composition using a standard BPA polycarbonate in lieu of the polycarbonate terpolymer when measured as the percent retention of Tensile Elongation evaluated according to ISO 4599 using injection 4 mm thick molded tensile bars and wherein the chemical resistance is among one or more of an insect repellant having active ingredients of 200 g/kg N,N-diethyl-m-toluamide and 435 g/kg ethanol, ethyl acetate or a 50/50 mixture by volume of toluene and isooctane.

11. The thermoplastic composition of claim 10, wherein in the first dihydroxy (I) of Formula (A) n is 0 and in the second dihydroxy (II) of Formula (A) n is 1 and $R^f$ is $C_1$.

12. The thermoplastic composition of claim 10, wherein the ungrafted rigid copolymer is derived from acrylonitrile monomer or (meth)acrylate monomer.

13. The thermoplastic composition of claim 11, wherein the ungrafted rigid copolymer is SAN or PMMA.

14. The thermoplastic composition of claim 10, further comprising a flow promoter comprising a low molecular weight hydrocarbon resin derived from petroleum $C_5$ to $C_9$ feedstock.

15. The thermoplastic composition of claim 10, wherein the impact modifier is ABS, MBS, ASA, polycarbonate-polysiloxane copolymer, or a combination of two or more of the foregoing impact modifiers.

16. An article formed from the thermoplastic composition of claim 10.

17. A thermoplastic composition comprising from about 10 to about 85 wt. % of a polycarbonate terpolymer comprising structures derived from structures (I), (II) and (III), wherein (I) is a dihydroxy compound having the structure (A):

(A)

wherein n is 0;
(II) comprises a second dihydroxy compound derived from Formula (A) wherein n is 1 and $R^f$ is methyl;
(III) a third dihydroxy compound not derived from Formula (A), wherein the sum of the mol percent of all of structures (I) and (II) is greater than 45% relative to the sum of the molar amounts of all of structures (I), (II) and (III) in the polycarbonate terpolymer, the ratio of compounds (I):(II):(III) is about 1:1:1, and wherein the polycarbonate terpolymer is amorphous;

from about 5 to about 45 wt. % of an impact modifier; and
from about 10 to about 45 wt. % of an ungrafted rigid copolymer, wherein the sum of the polycarbonate terpolymer, the impact modifier and the ungrafted rigid copolymer equals 100 wt. %, and wherein the composition has a scratch resistance that is better than the same composition using a standard BPA polycarbonate in lieu of the polycarbonate terpolymer when measured according to ISO 1518 at a constant load of 6 N and a chemical resistance that is better than the same composition using a standard BPA polycarbonate in lieu of the polycarbonate terpolymer when measured as the percent retention of Tensile Elongation evaluated according to ISO 4599 using injection 4 mm thick molded tensile bars and wherein the chemical resistance is among one or more of an insect repellant having active ingredients of 200 g/kg N,N-diethyl-m-toluamide and 435 g/kg ethanol, ethyl acetate or a 50/50 mixture by volume of toluene and isooctane.

18. The thermoplastic composition of claim 17, wherein the third dihydroxy compound is bisphenol A.

* * * * *